April 29, 1969     L. PATRIGNANI     3,441,763
SLIPRING MOTOR OR GENERATOR WITH AN AXIAL AIRGAP
Filed Jan. 23, 1967
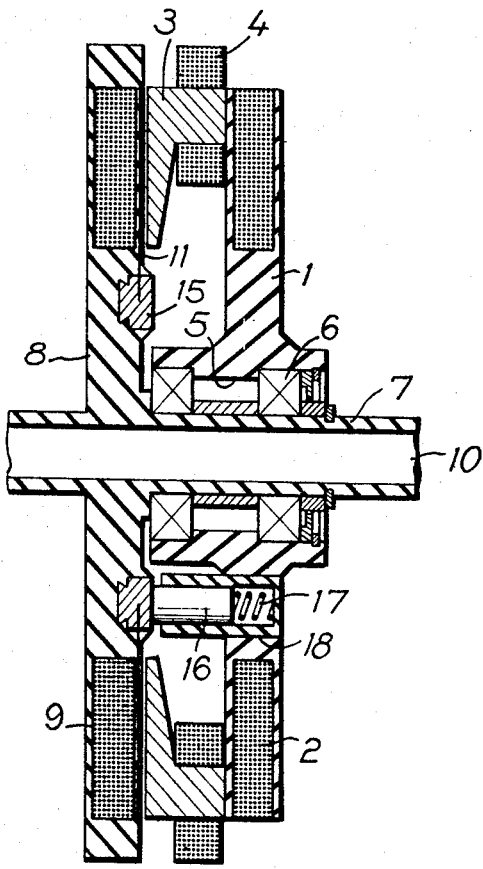
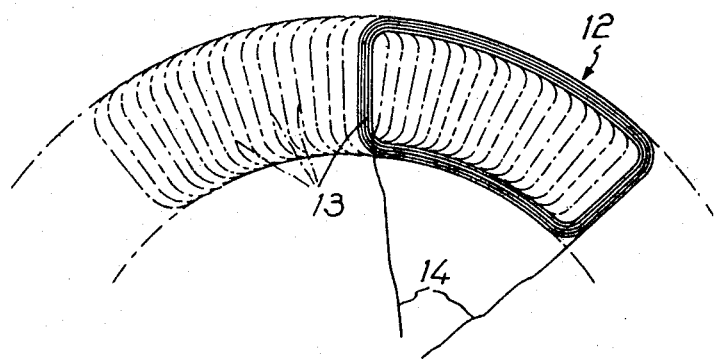

United States Patent Office 3,441,763
Patented Apr. 29, 1969

3,441,763
SLIPRING MOTOR OR GENERATOR WITH AN AXIAL AIRGAP
Leonida Patrignani, deceased, late of Florence, Italy, by Nida Patrignani, nee Balasso; Anna-Maria Patrignani, and Sergio Patrignani, legal representatives, all of 23 Via Desiderio de Settignano, Florence, Italy
Filed Jan. 23, 1967, Ser. No. 611,175
Claims priority, application France, Jan. 24, 1966, 46,914
Int. Cl. *1/04, 3/00, 3/30*
U.S. Cl. 310—179           5 Claims

ABSTRACT OF THE DISCLOSURE

A slipring motor or generator with an axial airgap. The armatures of both stator and rotor are made of magnetic wire embedded in synthetic resin and the rotor winding is made of flat coils of wire embedded in synthetic resin and mounted on an end face of the rotor facing pole pieces of the stator.

---

This invention relates to a rotary electrical machine with an axial airgap.

It has been proposed to construct rotary electrical machines, for example motors, dynamos and alternators with an axial airgap so as to provide a flat assembly having reduced bulk and weight, the rotor and the stator taking the form of discs.

According to the present invention there is provided in a rotary electrical machine with an axial airgap including a stator disc and a rotor disc, the improvement which comprises a stator disk built up from elongate magnetic material wound to form at least one layer, a stator mass of synthetic resin embedding the elongate material of the stator, a rotor disc built up from elongate magnetic material wound to form at least one layer, a rotor mass of synthetic resin embedding the elongate material of the rotor, a plurality of stacked flat windings each including substantially radially extending conductors, and a winding mass of synthetic resin embedding said windings, the said radially extending conductors occupying substantially the whole of the surface of one end face of the rotor, and the rotor constituting a unitary assembly.

Other characteristics and advantages of the present invention will appear from the following description of one embodiment given only by way of example, the description being given with reference to the accompanying drawing, in which:

FIGURE 1 is a view in axial section of a slipring motor in accordance with the invention; and FIGURE 2 is a fragmentary front view of one of the faces of the rotor of the motor.

The rotary electrical machine shown in FIGURE 1, is, by way of example, a slipring motor but it will be clear that this may be constituted by any other form of motor or electricity generator.

The slipring motor comprises a stator body 1 of which the armature 2 is constituted by wire of magnetic material which is wound in one or more layers and which is embedded in a synthetic resin material constituting the disc of the stator, in such a manner as to a form a unitary assembly.

On the periphery of the stator, at its internal face, there are glued on to the synthetic resin material, pole pieces 3 constituted by stamped-out sheet metal, and which carry the winding 4 of the stator.

In its central part, the stator 1 has a bore 5 which accommodates roller bearings 6 which are mounted on the shaft 7 of the rotor 8. This rotor 8 is constructed similarly to the stator 1, that is to say by constructing the armature 9 of magnetic material which is wound in one or more layers and which is embedded in synthetic resin material forming the disc of the rotor 8.

The shaft 7 of the rotor 8 has a central bore 10 of dimensions enabling its use in several different apparatus.

Opposite to the pole pieces 3 of the stator, there are mounted windings 11 of the rotor which is constituted by an assembly of flat windings such as 12, which are located one following after the other, as shown in FIGURE 2, in such a manner that the radially extending conductors 13 occupy the whole of the surface of the rotor.

These windings 12 are thus placed, after embedding of the armature wires 9 against one of the faces of the rotor where they are glued or secured in the same manner on the rotor.

Each of the windings 12 is constituted by an insulated conductor wire 14 which is wound as a spiral so as to form at least one layer of wire. There is thus obtained, as shown in FIGURE 2, a winding of small thickness enabling the production of a very thin winding assembly. In order to provide such a thin winding assembly 11, it is also possible to use windings 12 enclosed one within the other and having to this end substantially the form of a convex trapezium, thus avoiding the superposition of two large a number of layers of wire.

The ends of the wire of the windings 12 are connected in known manner to parts of the slipring 15 which are likewise embedded in one of the faces of the rotor during manufacture.

Brushes 16 disposed in guide members 18, rigid with the stator 1, are biased by resilient members 17 against the parts 15 of the slip ring assembly.

The various parts constituting the rotor and the stator are constructed of simple elements such as metallic wire and do not require any particular machining, the armatures having no slots for locating the windings.

On the other hand, in the embodiment hereinbefore described, wire is used, but it is evident that it would be possible to use, as is already known, a wound strip of sheet metal.

The electrical rotary machine in accordance with the invention is of very simple construction and of low cost, on assembly, reliability of operation being obtainable without it being necessary to resort to very exact methods of manufacture.

Nevertheless, the machine operates with a high efficiency and can be used for example in control apparatus, machine tools, vehicles, and the textile industry, whenever it is desired to provide a drive means or an electrical generating means which is economical and of low bulk.

It will be understood, that the present invention is not limited to the embodiment hereinbefore described and shown, but covers on the contrary all modifications.

What is claimed is:

1. In a rotary electrical machine with an axial airgap including a stator disc and a rotor disc, the improvement which comprises, a stator armature built up from elongate magnetic material wound to form at least one layer, said stator armature being embedded in a synthetic resin forming a stator disc, a rotor armature built up from elongate magnetic material wound to form at least one layer, said rotor armature being embedded in a synthetic resin forming a rotor disc, a plurality of stacked flat windings each including substantially radially extending conductors, and being embedded in a mass of synthetic resin forming a unitary rotor winding, said rotor winding being secured to one end face of said rotor disc, the said radially extending conductors occupying substantially the whole of the surface of the said one end face of the rotor disc, and the rotor disc constituting a unitary assembly.

2. A machine according to claim 1, wherein the flat windings of the rotor are constituted by an insulated wire wound in spiral form in order to form at least one layer of wire.

3. A machine according to claim 1, wherein the stator disc has an internal face opposed to the rotor winding and wherein said internal face has secured thereto, pole pieces of stamped sheet metal.

4. A machine according to claim 3, further comprising stator windings,
said stator windings being mounted by the said pole pieces.

5. A machine according to claim 1, and further including a slipring embedded in said rotor disc and a plurality of brushes mounted on said stator disc in engagement with the slipring, and guide means for the brushes.

References Cited
UNITED STATES PATENTS

| 2,758,231 | 8/1956 | Welter | 310—268 |
| 3,261,998 | 7/1966 | Bosco | 310—268 |

WARREN E. RAY, *Primary Examiner.*

R. SKUDY, *Assistant Examiner.*

U.S. Cl. X.R.

310—232, 254, 268